3,383,373
ETHYLENE/AMINOALKYL ESTER COPOLYMERS
George E. Waples, Jr., Lake Jackson, Tex., assignor to
The Dow Chemical Company, Midland, Mich., a corporation of Delaware
No Drawing. Filed June 30, 1965, Ser. No. 468,561
4 Claims. (Cl. 260—86.7)

ABSTRACT OF THE DISCLOSURE

Ethylene copolymers prepared by reacting ethylene with an ester of acrylic or methacrylic acid and an alkanol amine such as aziridinyl alcohols and amino alcohols. These ethylene copolymers have been found to be useful as molding compositions for the manufacture of useful films and coatings.

The present invention relates to ethylene copolymers and more particularly to copolymers of ethylene and an ester of an alkanol amine and an ethylenically unsaturated monocarboxylic acid.

According to the present invention ethylene copolymers are prepared by polymerizing ethylene with an ester of an ethylenically unsaturated monocarboxylic acid having the formula

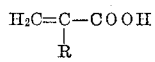

wherein R may be hydrogen or a methyl group and alkanol amine selected from aziridinyl alcohols having the general formula

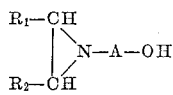

wherein $R_1$ and $R_2$ are selected from hydrogen and an alkyl group containing 1 to 2 carbon atoms and A is an alkylene group containing 2 to 4 carbon atoms and an aminoalcohol having the general formula

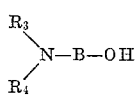

wherein $R_3$ and $R_4$ is either hydrogen or an alkyl group containing to 4 carbon atoms and B is an alkylene group containing 2 to 4 carbon atoms.

Suitable aziridinyl alcohols used to prepare the esters employed in the present invention include 2-(1-aziridinyl) ethano, 2-(2-methyl-1-aziridinyl)ethanol, 2-(2,3-dimethyl-1-aziridinyl)ethanol, 2-(2-ethyl-1-aziridinyl)ethanol, 3-(1-aziridinyl)-1-propanol, 3-(2-ethyl-3-methyl-1-aziridinyl)-1-propanol, 4-(1-aziridinyl)-1-butanol and 4-(2-ethyl-3-methyl-1-aziridinyl)-1-butanol.

Suitable aminoalcohols used to prepare the esters employed in the present invention include amino ethanol 2-(methylamino)ethanol, 2-(dimethylamino)ethanol, 2-(ethylamino)ethanol, 2-(diethylamino)ethanol, 2-propylamino)ethanol, 2-(dipropylamino)ethanol, 2-(isopropylamino)ethanol, 2 - (diisopropylamino)ethanol, 2-butylamino)ethanol, 2 - (dibutylamino)ethanol, 2 - (isobutylamino)ethanol, 2-(sec-butylamino)ethanol and 2-(tert-butylamino)ethanol, 3-(methylamino)propanol and 4-(dimethylamino)butanol.

Suitable ethylenically unsaturated monocarboxylic acids used to prepare the esters employed in the present invention include acrylic acid, and methacrylic acid.

Illustrative examples of the alkanol amine esters of monoethylenically unsaturated acids which may be co-polymerized with ethylene to prepare the ethylene copolymers of the present invention include 2-(1-aziridinyl) ethyl acrylate, 2-(1-aziridinyl)ethyl methacrylate, 3-(1-aziridinyl)propyl acrylate, 3-(1-aziridinyl)propyl methacrylate, 4-(1-aziridinyl)butyl acrylate, 4-(1-aziridinyl) butyl methacrylate, amino ethyl acrylate, 2-(methylamino)ethyl acrylate, 2-(dimethylamino)ethyl acrylate, 2-(dimethylamino)ethyl methacrylate, 2-(ethylamino)ethyl acrylate, 2-(diethylamino)ethyl acrylate, 2-(propylamino) ethyl acrylate, 2-(butylamino)ethyl acrylate, 2-(sec-butylamino)ethyl methacrylate, 2-(tert-butylamino)ethyl acrylate, 2-(tert-butylamino)ethyl methacrylate, 3-methylamino)propyl acrylate, 4-(dimethylamino)butyl acrylate.

Copolymer compositions of the present invention are obtained by reacting a major proportion of ethylene i.e. from about 55 to 99 percent by weight with about 1 to about 45 percent by weight of the alkanol amine/ethylenically unsaturated acid ester and preferably about 65 to about 99 percent by weight ethylene and about 1 to about 39 percent by weight of the alkanol amine/monoethylenically unsaturated acid ester.

The copolymers can be prepared by polymerizing mixtures of ethylene and the alkanol amine-ethylenically unsaturated acid ester in tubular or autoclave reactors at pressures from about 12,000 to 35,000 pounds per square inch, or higher, and at temperatures from about 150° C. to about 250° C. using, at catalytically effective concentrations, azo catalysts like α,α-azobisisobutyronitrile. Peroxygen-type catalysts are not effective catalysts for the polymerization. The azo catalyst is employed in the range from about 0.01 percent to about 0.10 percent, based on the weight of the monomers.

The ethylene copolymers of the present invention either alone or modified with fillers, synthetic resins and plasticizers find uses as molding compositions for the manufacture of useful films and coatings.

The copolymers are highly useful as adhesives and may be used as the resinous binding ingredient in the production of laminate articles of construction such as bound layers of wood, paper, glass, and the like. The presence of reactive nitrogen groups in the copolymer provides sites for the attachment of dyes and pigments and further provides reactive sites for cross-linking.

To illustrate the manner in which the invention may be carried out, the following examples are given. It is to be understood, however, that the examples are for the purpose of illustration and the invention is not to be regarded as limited to any of the specific materials or conditions recited therein. Unless otherwise stated, all percentages cited in the examples below are based on weight.

Example 1

Ethylene and 2-(dimethylamino)ethyl methacrylate (DMAEMA) were copolymerized in a series of runs identified and further described in Table I. The runs were carried out in a continuous manner in a 5-liter pressure autoclave stirred at 1200 r.p.m. at a temperature of 200°–210° C. and a pressure of 19,000–21,000 p.s.i. with the continuous addition of a 2%–3% benzene/hexane solution of α,α-azobisisobutyronitrile to maintain polymerization temperatures. Table I shows the average rate of feed of ethylene in pounds per hour and the percentage amount of the comonomer DMAEMA introduced into the ethylene feed introduced in the autoclave. The amount of DMAEMA found in each product produced is also shown.

Table I further shows properties of the resulting copolymer products.

Melt index is measured by ASTM D-1238-57T.

Tensile and yield strength in p.s.i. and elongation in percent of original length at break are measured by ASTM D-638-58T on specimens cut using die B of ASTM D-412-51T pulled at 10 inches per minute.

Rigidity is by ASTM D-747-58T.

Hardness is by Shore C method.

TABLE I

| Run No. | 1 | 2 | 3 | 4 | 5 |
|---|---|---|---|---|---|
| Ethylene Feed Rate, lbs./hr. | 50.0 | 50.0 | 47.5 | 50.0 | 45.0 |
| Percent DMAEMA in Feed | 1.71 | 0.83 | 1.72 | 2.59 | 3.23 |
| Percent DMAEMA in Product | 0.9 | 2.7 | 4.6 | 15.2 | 17.3 |
| Melt Index, dg./min. | 0.016 | 0.04 | 2.01 | 60.6 | 42.3 |
| Tensile Strength, p.s.i. | 1,590 | 2,255 | 1,670 | 815 | 945 |
| Yield Strength, p.s.i. | 1,660 | 1,480 | 1,330 | 900 | 1,015 |
| Elongation, Percent | 270 | 520 | 500 | 130 | 95 |
| Rigidity×10⁻⁴, p.s.i. | 2.54 | 1.78 | 1.57 | 0.86 | 1.31 |
| Hardness | 85 | 80 | 80 | 70 | 75 |

Example 2

Copolymers of ethylene and 2-(tert.-butylamino)ethyl methacrylate (TBAEMA) were prepared following the procedure of Example 1. The copolymerization was conducted at about 200° C. and 21,000 p.s.i. pressure with the constant addition of a 3 percent benzene/hexane solution of α,α-azobisisobutyronitrile to maintain polymerization temperatures. The feed rates of the monomers, the TBAEMA content of the resultant copolymers and their properties are summarized in Table II below.

TABLE II

| Run No. | 6 | 7 | 8 | 9 | 10 | 11 |
|---|---|---|---|---|---|---|
| Ethylene Feed Rate, lbs./hr. | 43.0 | 40.0 | 50.0 | 47.0 | 50.0 | 50.0 |
| Percent TBAEMA in Feed | 1.15 | 3.25 | 3.52 | 1.60 | 2.44 | 2.25 |
| Percent TBAEMA in Product | 6.2 | 10.3 | 11.6 | 11.9 | 14.6 | 21.8 |
| Melt Index, dg./min. | 0.06 | 2.57 | 26.6 | 32.5 | 57.5 | 225.0 |
| Tensile Strength, p.s.i. | 2,025 | 1,420 | 770 | 875 | 755 | 500 |
| Yield Strength, p.s.i. | 1,330 | 1,110 | 905 | 1,010 | 880 | 555 |
| Elongation, Percent | 495 | 500 | 185 | 290 | 235 | 100 |
| Rigidity×10⁻⁴, p.s.i. | 1.81 | 1.11 | 0.85 | 0.99 | 0.91 | 0.43 |
| Hardness | 80 | 75 | 75 | 75 | 70 | 55 |

Example 3

A copolymer of ethylene and 2-(1-aziridinyl)ethyl methacrylate (AEMA) was prepared following the procedure of Example 1. The copolymerization was conducted at 204° C. and 18,000 p.s.i. pressure with the constant addition of a 3 percent benzene/hexane solution of α,α-azobisisobutyronitrile to maintain polymerization temperatures. The feed rates of the monomers, the 2-(1-aziridinyl)ethyl methacrylate content of the resultant copolymer and its properties are summarized below.

| | |
|---|---|
| Ethylene feed rate, lbs./hr. | 48.2 |
| AEMA feed rate, lbs./hr. | 0.83 |
| Percent AEMA in product | 17 |
| Melt index | 7.65 |
| Tensile strength, p.s.i. | 1185 |
| Yield strength, p.s.i. | 885 |
| Elongation, percent | 625 |
| Rigidity×10⁻⁴, p.s.i. | 0.6 |
| Hardness | 65 |

The ethylene/2-(1-aziridinyl)ethyl methacrylate copolymer was found to cross-link upon heating at elevated temperatures, as indicated by the decrease in the melt index of the copolymer as heating is continued. The melt index of the copolymer after heating at 190° C. for varying time intervals is summarized below:

| Heating time at 190° C. (minutes): | Melt index (ASTM D-1238-57T) g./10 min. |
|---|---|
| 5 | 7.65 |
| 10 | 5.42 |
| 15 | 3.27 |
| 20 | 2.09 |
| 25 | 1.16 |
| 30 | 0.79 |

What is claimed is:

1. A copolymer comprising the reaction product of ethylene with an ester of an ethylenically unsaturated monocarboxylic acid having the formula

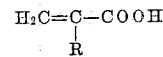

wherein R is selected from the group consisting of hydrogen and methyl groups, and aziridinyl alcohols having the formula

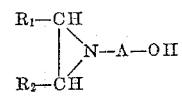

wherein $R_1$ and $R_2$ are independently selected from the group consisting of hydrogen and an alkyl group containing 1 to 2 carbon atoms and A is an alkylene group containing 2 to 4 carbon atoms.

2. The copolymer of claim 1 wherein the ethylenically unsaturated monocarboxylic acid is methacrylic acid.

3. The copolymer of claim 1 wherein the aziridinyl alcohol is 2-(1-aziridinyl)ethanol.

4. The copolymer of claim 1 wherein the ester is 2-(1-aziridinyl)ethyl methacrylate.

References Cited

UNITED STATES PATENTS

| 3,179,532 | 4/1965 | Sheehan | 260—86.1 |
| 3,243,418 | 3/1966 | Shouse et al. | 260—86.7 |
| 3,282,879 | 11/1966 | Werner | 260—29.6 |
| 3,296,167 | 1/1967 | Turner et al. | 260—86.1 |

JOSEPH L. SCHOFER, *Primary Examiner.*

HARRY WONG, Jr., *Examiner.*